United States Patent [19]

Naito

[11] 4,394,533

[45] Jul. 19, 1983

[54] AIR-COOLED CABLES WITH TERMINALS AND METHOD OF PRODUCING SAME

[76] Inventor: Mitsuo Naito, 1406, Haguro-cho, Kofu-shi, Yamanashi, Japan

[21] Appl. No.: 274,424

[22] Filed: Jun. 17, 1981

[30] Foreign Application Priority Data

Jun. 25, 1980 [JP] Japan ................................. 55-85161

[51] Int. Cl.³ ........................ H01R 4/18; H01R 13/56
[52] U.S. Cl. .................................... 174/74 R; 29/863; 174/15 WF; 339/29 R; 339/276 T
[58] Field of Search ..................... 174/15 WF, 74 R; 339/29 R, 223 R, 275 RB, 275 T, 276 RB, 276 T, 277 R; 219/137.9; 238/14.1, 14.11; 29/861, 862, 863

[56] References Cited

U.S. PATENT DOCUMENTS 1,215,933  2/1917  Hartman ................. 339/275 RB X
3,404,369  10/1968  Grove ....................... 174/15 WF X

FOREIGN PATENT DOCUMENTS 511473   10/1930  Fed. Rep. of Germany .... 339/29 R
2030239  12/1971  Fed. Rep. of Germany .... 339/29 R
778454    7/1957  United Kingdom ............ 339/276 T

OTHER PUBLICATIONS

*Popular Mechanics*, "Replacement Terminals", Dec. 1960, p. 153.

*Primary Examiner*—Laramie E. Askin
*Attorney, Agent, or Firm*—Oblon, Fisher, Spivak, McClelland & Maier

[57] ABSTRACT

One end portion of a cable comprising a multiplicity of core wires is inserted into a cylindrically shaped electrically conductive member one end of which is flared. A band made of synthetic resin or synthetic rubber or the like is provided on the end portion of the cable, and the cylindrical electrically conductive member, except for flared portion thereof, is pressed into a rectangular shape.

5 Claims, 5 Drawing Figures

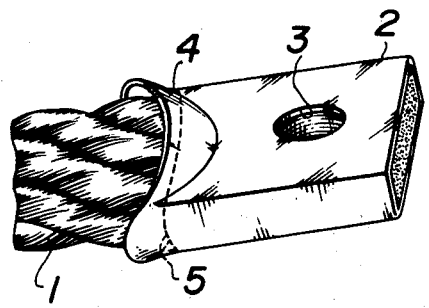
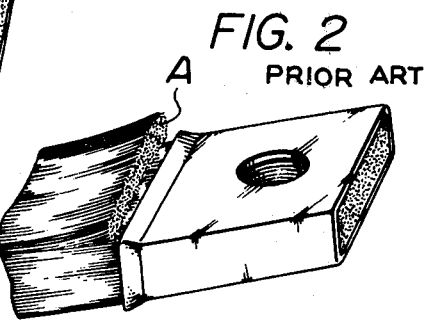
FIG. 1
FIG. 2 PRIOR ART
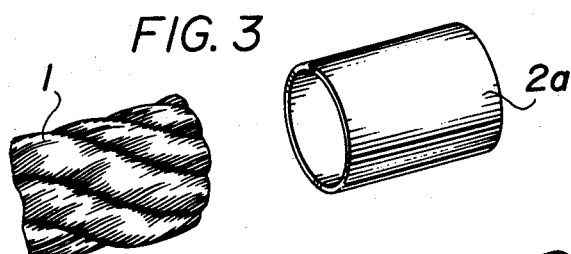
FIG. 3
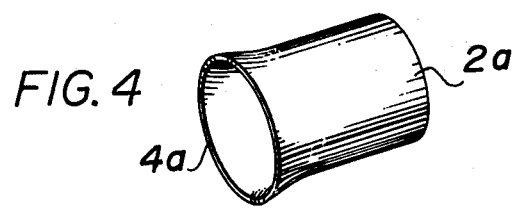
FIG. 4
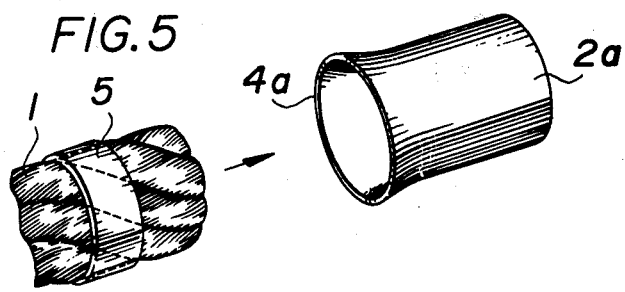
FIG. 5

AIR-COOLED CABLES WITH TERMINALS AND METHOD OF PRODUCING SAME

BACKGROUND OF THE INVENTION

1. Field of the Invention

This invention relates to a cable for spot welding for use in the automobile industry, in the manufacture of railway cars, in ship-building and in production lines for electrical parts and for other applications. More specifically, the invention relates to a terminal which is adapted to fix the end of an air-cooled cable composed of core wires and to connect the end of the cable to another electrical circuit.

2. Description of the Prior Art

In a spot welding operation, the cable of a welding gun experiences repetitive physical fatigue from bending and twisting since the welding gun is manipulated through a wide variety of angles to perform welding at the prescribed locations. In addition, the cable is repeatedly raised in temperature since a high welding current of from 8000 to 15,000 amperes repeatedly flows through the cable. At such times the core wires of the cable strike one another forcefully owing to the generation of an impact force referred to as "kick". Although the exterior of the cable is generally covered with a hose for protection and insulation purposes, this cannot mitigate the physical fatigue and electrical impact force described above. The physical fatigue and electrical impact are concentrated at the portion where the cable is connected to a fixed terminal, and both physical and electrical impact forces repeatedly act upon the cable whenever the spot welding operation is carried out. This leads to cable severence at the connected portion. Furthermore, whenever a large current flows, the cable temperature is elevated and wires may break as a result of overheating. Such a damaged cable would no longer be capable of withstanding use and would naturally require replacement. However, this results in higher cable costs, increased downtime necessary for cable replacement, and higher costs necessary for the labor involved in cable replacement. It is extremely uneconomical when a considerably long period of time is required for cable replacement at a production line where workpieces are being welded at a high production speed of one workpiece per tens of seconds.

SUMMARY OF THE INVENTION

Accordingly, it is an object of the present invention to provide a terminal for an air-cooled cable that is easy to manufacture and that will not be severed.

Another object of the present invention is to provide a terminal for an air-cooled cable that almost never requires replacement of the cable.

It is a further object of the present invention to provide a terminal for an air-cooled cable, which terminal allows the cable to be maintained at a low cost.

An even further object of the present invention is to provide a terminal for an air-cooled cable that does not demand time for cable replacement, i.e., that does not require a halt in a spot welding operation.

According to a feature of the present invention, a cable comprising a multiplicity of core wires is inserted into a cylindrical electrically conductive member one end of which is flared, the electrically conductive member then being pressed into a rectangular configuration including a part of that portion thereof having the flared shape.

Other objects, features and advantages of this invention will be readily appreciated as the invention becomes better understood by reference to the following detailed description when considered in connection with the accompanying drawings.

BRIEF DESCRIPTION OF THE DRAWINGS

FIG. 1 is a perspective view of a terminal for an air-cooled cable in accordance with the present invention;

FIG. 2 is a perspective view showing an example of a conventional terminal for an air-cooled cable;

FIG. 3 is a perspective view of an air-cooled cable and a cylindrical conductive member in accordance with the present invention;

FIG. 4 is a perspective view of the cylindrical electrically conductive member one end of which has a flared configuration; and FIG. 5 is a perspective view showing an air-cooled cable and a cylindrical electrically conductive member in accordance with the present invention, the air-cooled cable having a covering layer applied thereto.

DESCRIPTION OF THE PREFERRED EMBODIMENT

Before proceeding with a description of the invention, reference will first be had to FIG. 2 showing the conventional terminal. The disadvantage with this terminal, as already described above, is that the core wires tend to break, as illustrated at the neck portion A, owing to physical and electrical impact forces which act upon the cable during use. One aspect of the present invention is to improve upon this disadvantage.

An embodiment of the present invention will now be described with reference to FIG. 1 and to FIGS. 3 through 5.

Illustrated in FIG. 1 is a cable 1 composed of a multiplicity of twisted cored wires, and a cable terminal 2 attached to the end of the cable 1. The terminal 2 has a square or rectangular cross-section and includes a hole 3 for connection to a welding gun or to a power supply, neither of which is shown in the drawings. It should be noted that the terminal cross-section need not necessarily be square or rectangular; a similar cross-sectional configuration such as a trapezoidal section may of course be adopted as long as good contact can be maintained for satisfactory conduction.

The terminal 2 has a flared portion 4 formed at that end which receives the cable 1. A covering layer 5 (shown more clearly in FIG. 5), consisting of a synthetic resin such as Teflon, or of synthetic rubber or the like, is wrapped around the cable 1 at that portion of the cable that is to be attached to the cable terminal 2. The covering layer 5, as will be described in greater detail later in connection with the production method, is wrapped on the end of the cable, after which that end of the cable is inserted into a round pipe and then pressed together with the pipe into a square or rectangular cross-section by means of a hydraulic press. While it has been described above that the covering layer 5 of synthetic resin or of synthetic rubber is wrapped around the cable 1, it is also possible to line or to coat the inner wall of the flared portion 4 of the terminal 2 beforehand with the synthetic resin or synthetic rubber.

Reference will now be had to FIGS. 3 through 5 to describe an example of cable manufacture.

The steps of manufacture include:

(i) preparing the cable 1 and a copper pipe 2a which has a circular cross-section and which has been cut to the length desired for the terminal (FIG. 3);

(ii) forming the flared portion 4a at one end of the copper pipe 2a by press-shaping (FIG. 4);

(iii) wrapping a Teflon strip 5 around the cable 1 at a portion adjacent the end thereof (FIG. 5);

(iv) inserting the Teflon-wrapped portion of the cable 1 into the copper pipe 2a from that end thereof having the flared portion 4a;

(v) shaping the copper pipe 2a into a terminal of a square or rectangular cross-section by slowly pressing the pipe at that portion thereof extending from the flared portion 4a by means of a hydraulic press which is not shown in the drawings (FIG. 1); and (vi) drilling the hole 3 through the terminal.

The cable manufactured by the method described above is pressed and shaped after the material such as Teflon has been disposed at the boundary portion between the flared portion and the portion thereof that is to be pressed into the rectangular or square shape. The cable 1 and terminal 2 are therefore pressed through the intermediary of the Teflon layer, and the portions where Teflon has been disposed do not come into direct contact. In consequence, the core wires constituting the cable are fixed under naturally applied pressing force without being subjected to excessive mechanical forces. Moreover, the neck portion of the arrangement is the flared portion 4. As a result, this portion is capable of bending and twisting freely during welding work so that the cable core wires are not flawed or severed.

Whereas the conventional arrangement develops frayed and broken cable core wires at the neck portion A, as depicted in FIG. 2, the arrangement of the present invention withstands spot welding satisfactorily, reduces costs, raises production line operating efficiency and reduces cable replacement labor, thereby enhancing welding quality and contributing to the safety of welding operations.

While a preferred embodiment of the present invention has been illustrated in detail, it will be apparent that many modifications and variations may be effected without departing from the scope of the novel concepts of this invention.

What I claim is:

1. A terminal in combination with an air-cooled cable employed in spot welding, said cable consisting of a plurality of non-insulated wires, said terminal comprising an electrically conductive member having first and second portions receiving an end of said cable, said first portion defining a concavity, said second portion being rectangular and extending from said first portion, said rectangular second portion having opposing first surfaces defining a height and opposing second surfaces defining a width, said width being greater than said height, said first portion forming a cone smoothly tapering into said second portion, the cable end being fixed within said rectangular portion, and a covering layer disposed between the cable and said electrically conductive member at the boundary between said first portion and said second portion, wherein the merger of said cone with said second surfaces forms a concave line facing said concavity, whereby said concavity is nearly circular.

2. The combination of claim 1 wherein said covering layer comprises a single ring of low friction material, said ring completely circumferentially covering said cable at said boundary.

3. The combination of claim 2 wherein said low friction material comprises polytetrafluoroethylene.

4. A method of producing a terminal on an air-cooled cable used in spot welding, comprising the steps of:
flaring one end of a cylindrical electrically conductive member into a conical configuration, a portion of the inner diameter of said conical configuration being larger than the diameter of the cable;
forming a covering layer only on a selected end portion of said cable;
inserting said cable end portion into said cylindrical electrically conductive member; and
pressing, into a rectangular configuration, said cylindrical electrically conductive member at a portion thereof including a part of said end flared into the conical configuration, whereby said cable end portion is fixed in said electrically conductive member and wherein said cable end portion is inserted such that said selected end portion is at a boundary between said flared end and said rectangular configuration.

5. The method of claim 4 wherein said covering layer comprises a low friction material and is formed as a single ring completely circumferentially covering said selected end portion of said cable.

* * * * *